(12) United States Patent
Lin et al.

(10) Patent No.: US 8,948,517 B2
(45) Date of Patent: Feb. 3, 2015

(54) LANDMARK LOCALIZATION VIA VISUAL SEARCH

(71) Applicant: Adobe Systems Incorporated, San Jose, CA (US)

(72) Inventors: Zhe Lin, Fremont, CA (US); Jonathan Brandt, Santa Cruz, CA (US); Xiaohui Shen, Evanston, IL (US)

(73) Assignee: Adobe Systems Incorporated, San Jose, CA (US)

( * ) Notice: Subject to any disclaimer, the term of this patent is extended or adjusted under 35 U.S.C. 154(b) by 140 days.

(21) Appl. No.: 13/782,804

(22) Filed: Mar. 1, 2013

(65) Prior Publication Data

US 2014/0247993 A1 Sep. 4, 2014

(51) Int. Cl.
*G06K 9/46* (2006.01)
*G06T 7/00* (2006.01)
(52) U.S. Cl.
CPC ................................. *G06T 7/0079* (2013.01)
USPC ........................................................ 382/195

(58) Field of Classification Search
USPC ...................... 340/995.24; 382/190, 195, 201; 701/426, 438
See application file for complete search history.

(56) References Cited

U.S. PATENT DOCUMENTS

2006/0088187 A1* 4/2006 Clarkson et al. .............. 382/103

* cited by examiner

*Primary Examiner* — Gregory F Cunningham
(74) *Attorney, Agent, or Firm* — Kilpatrick Townsend & Stockton LLP

(57) ABSTRACT

One exemplary embodiment involves identifying feature matches between each of a plurality of object images and a test image, each of the feature matches between a feature of a respective object image and a matching feature of the test image, wherein there is a spatial relationship between each respective object image feature and a first landmark of the object image, the first landmark at a known location in the object image. The embodiment additionally involves estimating a plurality of locations for a second landmark for the test image, the estimated locations based at least in part on the feature matches and the spatial relationships, and estimating a final location for the second landmark from the plurality of locations for the second landmark for the test image.

20 Claims, 12 Drawing Sheets

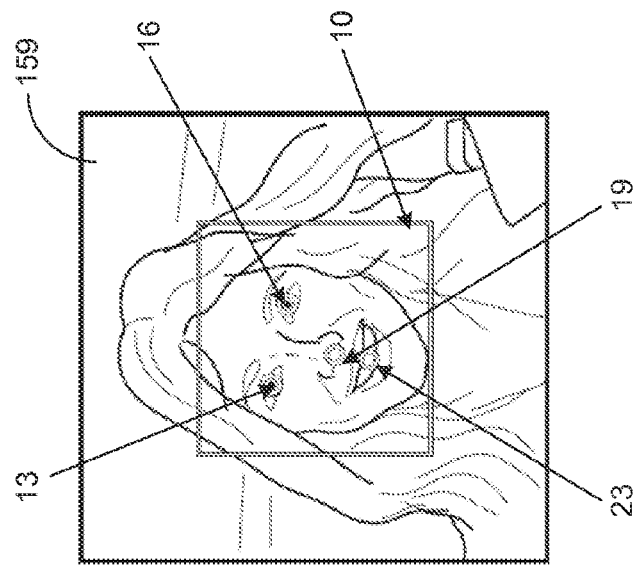
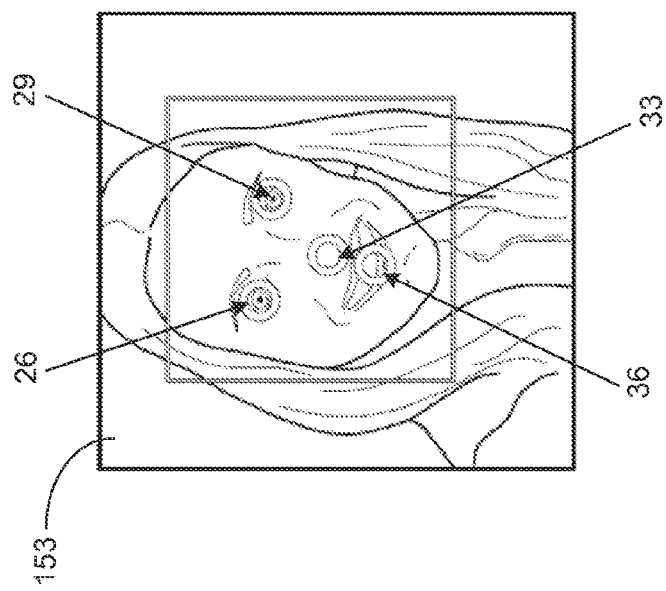
FIGURE 1

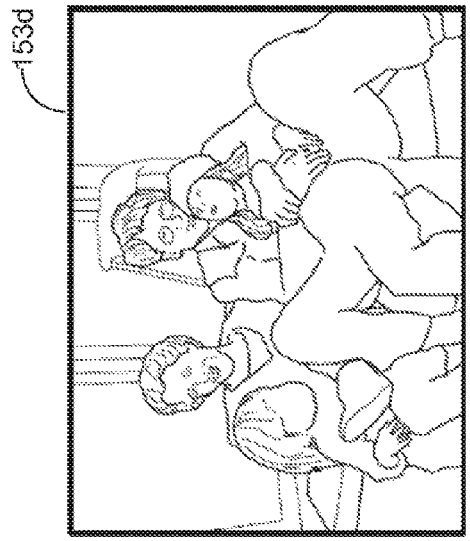
FIG. 3

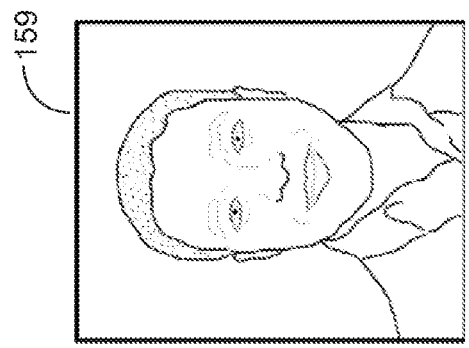
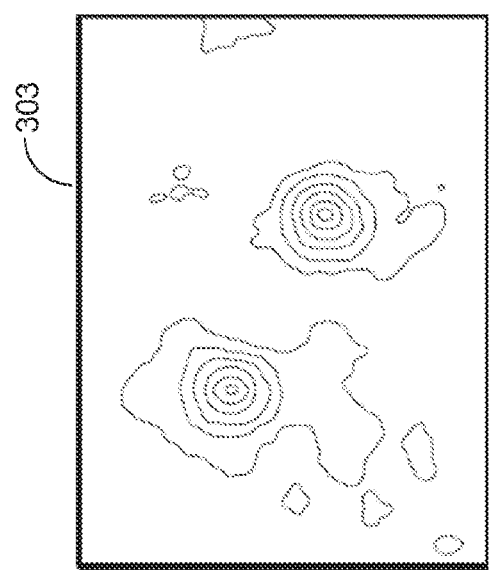
FIG. 4

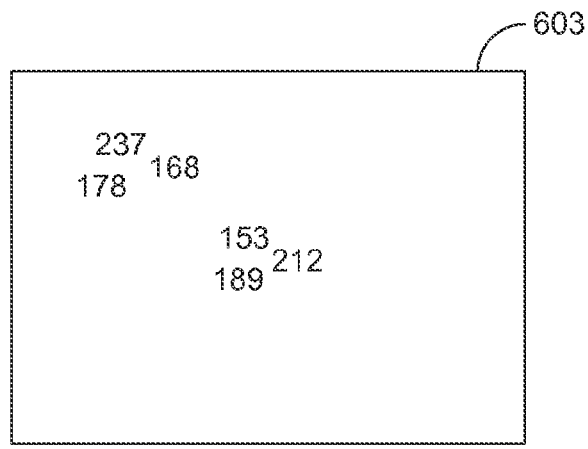
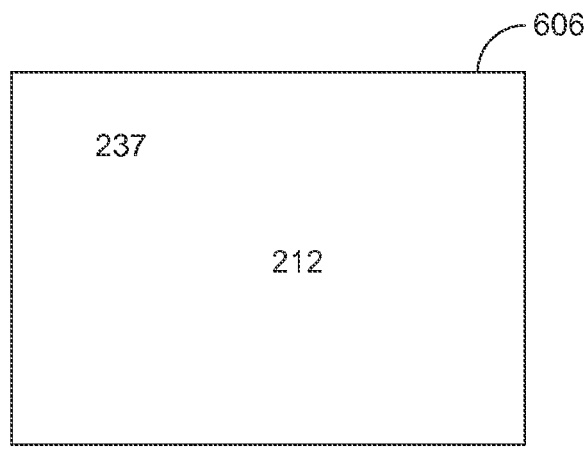
FIG. 7

LANDMARK LOCALIZATION VIA VISUAL SEARCH

FIELD

This disclosure relates generally to computer software and more particularly relates to the creation, modification, use, and distribution of images and similar electronic content.

BACKGROUND

Many conventional approaches to detecting objects in images are based on a sliding window approach. For example, if the object to be detected is a face of an individual, the sliding window approach calls for sliding a rectangle across the image and collecting "face likelihood" information to implement face detection. One of various conventional techniques may be applied to implement the object detection, such as, for example, the Viola-Jones detection framework using the Haar-wavelet technique. These conventional techniques involve training a binary classifier from an image database that consists of both objects and non-objects and then sliding a rectangle across each image in the database to perform the detection and in some instances, varying the scale of the images based on the test image to be detected. Each subimage corresponding to the sliding rectangle is examined by the binary classifier to determine if it is an instance of the object category, e.g., a face.

However, existing use of the sliding window approach can provide poor results in certain circumstances. For example, for face detection, a test image may be a profile view of a face, a slanted view of a face, and/or may otherwise depict an occluded view of a face. The sliding window approach is limited with respect to detecting these types of faces because of the difficulty of learning a good classifier encoding all possible variations. Additionally, the sliding window approach can provide poor or no results for detecting, locating and recognizing various landmarks on the test image.

SUMMARY

Disclosed are embodiments for estimating locations of landmarks in a test image. Disclosed are embodiments for receiving, at a computing device comprising a processor, a test image and a plurality of object images detected to depict an object similar to the test image and receiving a plurality of landmark indicators, each landmark indicator indicating a location of a landmark in the object depicted in a respective one of the object image. Additionally, disclosed are embodiments for determining, for each object image, a location of a test image landmark that corresponds with the respective landmark indicator in the object image and computing a final test image landmark location based on the determined locations of the test image landmarks.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

The file of this patent contains at least one drawing executed in color. Copies of this patent with color drawing(s) will be provided by the Patent and Trademark Office upon request and payment of the necessary fee. These and other features, aspects, and advantages of the present disclosure are better understood when the following Detailed Description is read with reference to the accompanying drawings, where:

FIG. 1 illustrates validation of a candidate sub-rectangle of a test image with a known location of an object in an object image;

FIG. 3 is an illustration of images for detecting objects depicted in the images that may result in poor results using the sliding window approach;

FIG. 4 is an illustration of a similarity voting map defining the similarity between a test image and an exemplar image;

FIG. 7 is an illustration of selecting maximum modes and implementing non-*maxima* suppression;

DETAILED DESCRIPTION

Figure 2:
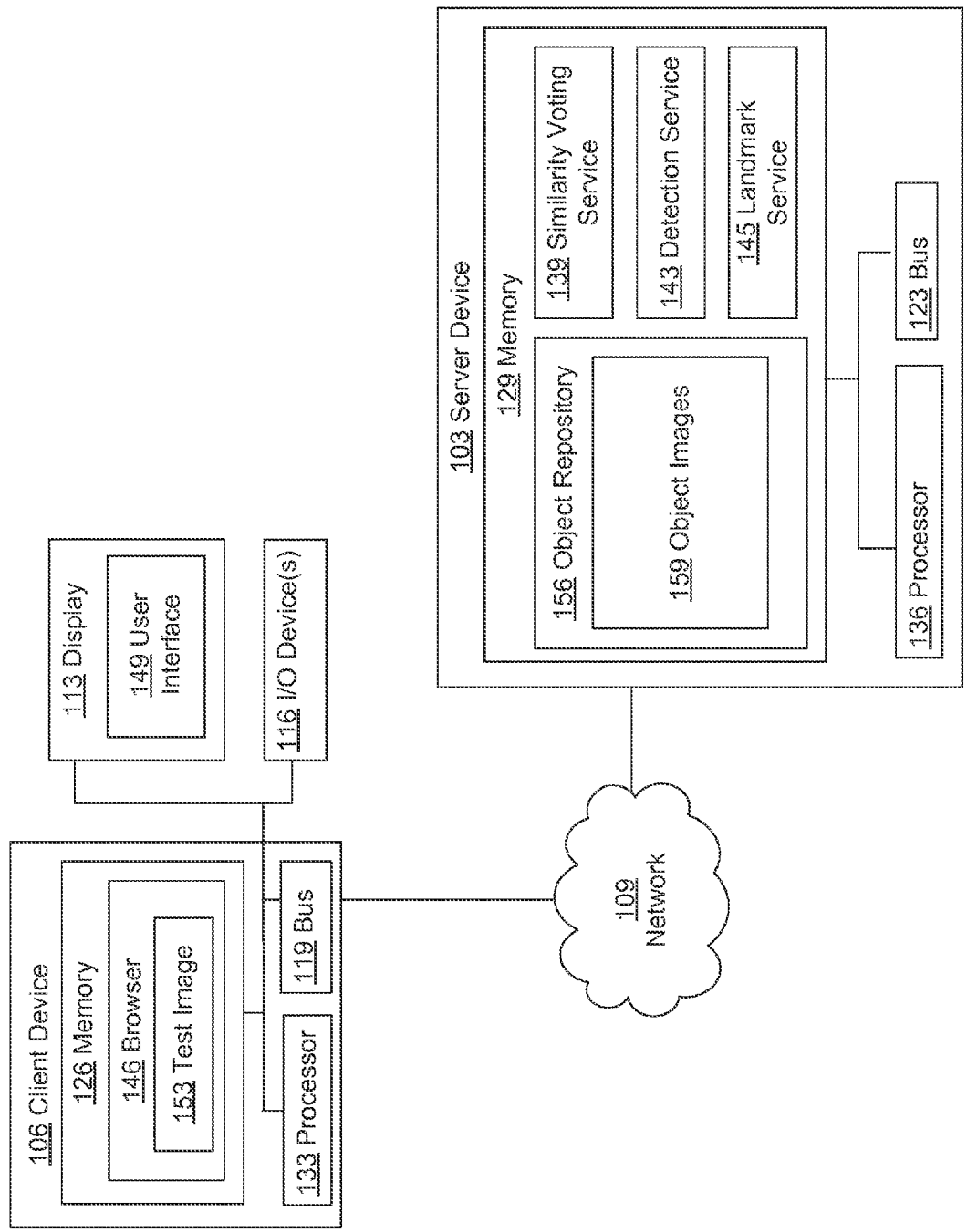
FIG. 2 is a block diagram depicting exemplary computing devices in an exemplary computing environment for implementing certain embodiments.

Methods and systems are disclosed for detecting landmarks of an object depicted in a test image based on a set of object images detected to depict a similar object as the test image by localizing the landmarks of the object in the object images to determine a location of the landmarks of the object depicted in the test image. For example, the test image may depict a face and the landmarks may include eyes, a nose, a mouth, a chin, ears, a jaw line, and/or any other landmark of the face as shown in FIG. 1. An object image of a similar face may be used to locate a landmark, e.g., the nose, on the test image. For example, a feature match may be identified between the test image and the object image. As a specific example, a portion of the test image may be determined to match a portion of the object image. The spatial relationship between that feature on the object image and the known location of the nose is identified. For example, it may be identified that nose is located 20 units to the left and 10 units above the location of the matched object image feature. This spatial information and the feature match are then used to cast a vote for an estimate of the location of the nose depicted in the test image. Additional feature matches and associated spatial relationships can be used to cast additional votes and ultimately to create a voting map. A potential location for the nose landmark is determined from that voting map. This potential location for the nose landmark is thus determined based on that first object image and represents a first estimate of the location of the nose depicted on the test image. Additional potential locations of the nose can be determined using additional object images in a similar manner. The results, i.e., the multiple potential location determined from the multiple object images, can be averaged or otherwise combined to determine a final location estimate for the nose landmark.

In one embodiment, the location of landmarks of the test image 153 may be determined using a set of top ranked detected object images 159. For instance, the location of a person's eyes on the test image may be determined based on the known locations of eyes on object images of other faces that are similar to the face of the test image. The top ranked, e.g., the object images with the faces that are the most similar to the face of the test image, may be selected in various ways. The object images 159 in the set of top ranked detected object images may be determined based on a set of similarity scores between the respective object image and the test image and similarity voting maps, as will be discussed. As another example, the object images 159 in the set of top ranked detected object images may be determined from a generalized Hough voting approach, and/or any other detection approach.

Landmarks of the object in each of the object images 159 can be received based on prior input, prior determinations or current input. The landmarks' locations may be identified manually or automatically. For example, the location of the object in the object image 159 may be manually indicated as shown by a rectangle 10 and the location of landmarks of the object may be manually indicated as shown by landmark indicators 13, 16, 19 and 23.

Various techniques can be used to use landmarks at known locations in the object images to estimate locations of similar landmark locations in the test image. To determine the location of the corresponding landmark on the object in the test image 153, the known locations of the landmarks in the object image 159 may be used as the reference point by a similarity voting approach, a generalized Hough voting approach, and/or another similarity approach to vote for a prediction of the landmark on the test object. For example, a left eye of a face of the object image 159 may have been manually indicated by landmark indicator 13 as a landmark of the face depicted in the object image 159. The location of the left eye in the face of the test image 153 may be determined by computing a voting map in the test image indicating the likelihood of "left eye" and choosing mode in the map.

For example, a similarity voting map may be generated to estimate the center of the left eye in the face of the test image. A similarity voting map is generated based on similarity scores between matching features of the test image 153 and a respective one of the object images 159. The similarity voting map is used to estimate the location of the landmark in the test image 159. Similarity voting maps may be generated for each known landmark in the object image 159. Each voting map provides an estimate of the center of the corresponding landmark in the test image 153. Thus, the location of test image landmark indicators 26, 29, 33 and 36 may be determined by a localization of the landmark indicators 13, 16, 19 and 23, respectively. The scores depicted or represented in a voting map can be weighted based on distance from the matched feature to the landmark in the object image such that a feature closer to the landmark will have a higher contribution to the score. Such weighting may improve the accuracy of the landmark location estimation.

The known landmark location in each of multiple object images 159 are used to determine an estimated location of the corresponding landmark in the test image 153. The estimated landmark locations estimated using each of the object images can be averaged or otherwise combined in estimating a final, i.e., overall estimate, of the location of the corresponding landmark in the test image. The technique can be repeated for each landmark, e.g., for the left eye, for the right eye, for the nose, etc.

These illustrative examples are given to introduce the reader to the general subject matter discussed here and are not intended to limit the scope of the disclosed concepts. The following sections describe various additional embodiments and examples with reference to the drawings in which like numerals indicate like elements.

FIG. 2 depicts an exemplary computing environment for detecting objects depicted in a test image based at least in part on similarity voting maps generated on the test image for a collection of object images stored in a data store. The methods and systems disclosed herein are also applicable on other computing systems and environments. The environment shown in FIG. 2 includes a wired or wireless network 109 connecting various devices 103 and 106. In one embodiment, the network 109 includes the Internet. In other embodiments, other networks, intranets, or combinations of networks may be used. Alternative configurations are possible.

As used herein, the term "device" refers to any computing or other electronic equipment that executes instructions and includes any type of processor-based equipment that operates an operating system or otherwise executes instructions. A device will typically include a processor that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tablets, laptop computers, Internet appliances, other processor-based devices, and television viewing devices. Exemplary devices 103 and 106 are respectively used as special purpose computing devices to provide specific functionality offered by their respective applications and by the interaction between their applications. As an example, client device 106 is shown with a display 113 and various input/output devices 116. A bus, such as bus 119 and bus 123, will typically be included in a device as well.

As used herein, the term "application" refers to any program instructions or other functional components that execute on a device. An application may reside in the memory of a device that executes the application. As is known to one of skill in the art, such applications may be resident in any suitable computer-readable medium and execute on any suitable processor. For example, as shown the devices 103 and 106 each have a computer-readable medium such as memory 126 and 129 coupled to a processor 133 and 136 that executes computer-executable program instructions and/or accesses stored information. Such processors 133 and 136 may comprise a microprocessor, an ASIC, a state machine, or other processor, and can be any of a number of computer processors. Such processors include, or may be in communication with, a computer-readable medium which stores instructions that, when executed by the processor, cause the processor to perform the steps described herein.

As used herein, the term "server" refers to an application that listens for or otherwise waits for requests or a device that provides one or more such applications that listens for or otherwise waits for requests. Server device 103 is an example of a server. A "server device" may be used to perform the searching of items based on a received search criteria from the user. For example, the server device 103 may include a similarity voting service 139 and a detection service 143.

A computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

In FIG. 2, client device 106 includes a memory 126 that includes a browser 146. In one embodiment, the browser 146 may be a browser that renders a user interface 149 on the display 113 associated with the client device 106. The browser 146 may be executed to transmit a request to the server device 103 for detecting objects depicted in a test image 153. For example, a user on the client device 106 may request to detect one or objects depicted in a test image 153 by manipulating the user interface 149 rendered on the display 113. The browser 146 may then transmit the request to the detection service 143 and in response, receive an indication of the detected object. In one embodiment, upon receiving the indication of the detected object, the browser 146 may render the indication of the detected object on the display 113.

The server device 103 includes a memory 129 that includes the similarity voting service 139, the detection service 143, a landmark service 145, an object repository 156, and/or other components. The object repository 156 includes a collection of object images 159. For example, the object images 159 may depict faces of individuals and the test image 153 may depict a face of one more of individuals. The detection service 143 receives the test image 153 and invokes the similarity voting service 139 to generate a similarity voting map for the test image 153 based on each object image 159 included in the object repository 156. The detection service 143 determines a set of object images 159 that detect an object similar to the test image 153 based on the similarity voting maps, as will be discussed. In one embodiment, the detection service 143 receives the similarity voting maps generated by the similarity voting service 139 and modifies each of the similarity voting maps to attempt to eliminate false positive results. For example, this may involve gating each similarity voting map using a similarity threshold. The gated maps are aggregated to provide an aggregate similarity voting map.

Having generated the aggregate similarity voting map, the detection service 144 then can apply a technique to identify the most representative score or scores within an aggregate similarity voting map. For example, an aggregate map may have a similarity score of 10 that is in a neighborhood surrounded by other nearby high scores in the same neighborhood that all reflect a similarity of a face to the corresponding portions of the test image represented by those scores. High scores in portions of the test image that are further away (i.e. outside of the neighborhood) may correspond to a different face but high scores that are near one another (i.e. within the neighborhood) can be treated as corresponding to a single object. Accordingly, a technique can be applied to select the best score or scores. In one embodiment, this involves the use of a maximum mode and non-maxima suppression of the aggregate similarity voting map. The resulting aggregated similarity voting map then reflects the location of the object in the test image. For example, a sub-rectangle can be determined from the similarity voting map where the highest similarity represents a center of the sub-rectangle of the test image thereby localizing the object in the test image.

The landmark service 146 estimates a location of landmarks of the object depicted in the test image 153 that correspond with the landmarks manually indicated in the object images 159. For example, a ground-truthing process may be applied where the location of the landmarks of the faces in the object images 159 are manually indicated. The landmark service 146 receives a set of object images 159 and estimates a location of the landmarks that correspond with the landmarks indicated on detected object images 159. In one embodiment, the landmark service 146 may receive a set of object images 159 have been previously detected to depict an object similar to the test image 153. Additionally, the set of object images 159 may be a number of top ranked images of the detected object images 159. For example, the landmark service 146 performs a weighted localization of the landmarks in the object images 159 to estimate a location of the corresponding landmark in the test image 153. To this end, the landmark service 146 may invoke the similarity voting service 139 to generate similarity voting maps for each of the known landmarks in the object image 159. The similarity voting maps are then used to estimate the location of the center of the corresponding landmark in the test image 153. For each landmark indicated in the object image 159, the landmark service 146 estimates a location of the corresponding landmark in the test image 153 via localization. The landmark service 146 then averages the estimated location from each of the object images 159 to generate a location for the corresponding landmarks in the test image 153.

In one embodiment, a user on the client device 106 transmits the request to detect the object depicted in the test image 153 by manipulating one or more user interfaces 149 rendered on the display 113 via one or more I/O devices 116, such as a keyboard and/or a mouse. The detection service 143 receives the request and invokes the similarity voting service 139 to generate a similarity voting map of the test image 153 based on each one of the object images 159 in the object repository 156, as described in U.S. patent application Ser. No. 13/552,595 entitled "Image Retrieval with Spatially-Constrained Similarity Measure and k-NN re-ranking" filed on Jul. 18, 2012 and U.S. patent application Ser. No. 13/624,615 entitled "A Technique to Mobile Product Image Search by Automatic Query Object Localization and Segmentation Application" filed on Sep. 21, 2012 which are hereby incorporated by reference in its entirety.

To this end, the similarity voting service 139 evaluates a similarity between the test image 153 and each one of the object images 159 in the object repository 156. A sub-rectangle indicating a location of the object in the object image 159 may have been previously identified. The similarity voting service 139 evaluates the content of the sub-rectangle with the object depicted in the test image 153, such as the features within the sub-rectangle. For instance, spatial information of each object image 159 may be represented by a sub-rectangle $B=\{x_c, y_c, w, h, \theta\}$ where $(x_c, y_c)$ is the coordinate of the rectangle center, w and h are the width and height of the rectangle respectively, and e is the rotated angle of the rectangle. The similarity voting service 139 determines whether the test image 159 has similar features as the features of the sub-rectangle in the object image 159. For example, the sub-rectangle in the test image 153 may be represented as $B'=\{x_c+x_t, y_c+y_t, s \cdot w, s \cdot h, \theta=\alpha\}$. The similarity voting service 139 determines the sub-rectangle in the test image 153 based on each object image 159 and generates a voting similarity map based on the similarity of features between the sub-rectangle of the test image 153 and the sub-rectangle of each object image 159. For example, the similarity may be represented by a numerical floating value such as 0.5, 10.8, 100.4 and the like. In one embodiment, the similarity voting service 139 may calculate the relative locations of features within the object image 159 with respect to the center and compare the calculated locations with the corresponding locations within the test image 153 to determine if the feature at the corresponding location in the test image 153 matches the feature of the object image 159.

Next, the similarity voting service 139 generates a similarity voting map between the test image 153 and each object image 159. For example, the similarity voting service 139 identifies a matching feature between the test image 153 and the object image 159 and determines a location of a rectangle center. The similarity voting service 139 then maps a voting score for the determined location. For instance, if the matching feature pairs are spatially consistent, then the corresponding center locations should be similar. The similarity voting service 139 generates a voting score for a complete set of matching pairs of elements between the test image 153 and the object image 159 and generates a voting map based on the cumulative voting scores of all of the matched features.

The detection service 143 then determines which ones of the similarity voting scores generated by the similarity voting service 139 is within a similarity threshold. To this end, the detection service 143 implements a "gating" approach to determine which portions of the similarity voting maps are within the similarity threshold for each object image 159. For example, the detection service 143 subtracts the similarity threshold from each similarity voting map and sets any negative values to zero. Each object image 159 in the object repository 156 may be associated with a similarity threshold. For instance, the similarity threshold may be based at least in part on an empirical estimation that an object depicted in the test image 153 is similar to the object depicted in the object image 159. In one embodiment, the similarity threshold represents the maximum similarity score between the object image 159 and any possible portion (for example, a non-face portion) of any test image 153 which can be determined based on past results through a training process. In the case of face detection, subtracting the similarity threshold from the similarity voting maps reduces the chances of non-face portions of the test image 153 being positively detected as faces. The detection service 143 implements the gating by subtracting the similarity threshold value from each similarity voting map thereby reducing all of the similarity scores represented by the similarity voting map. Any negative scores are replaced with a zero as the negative scores correspond with non-face portions of the test image 153 that would yield a false positive. The remaining similarity scores in the similarity voting map may then be used in the aggregation, as will be described.

Each object image 159 is associated with a similarity threshold. In one embodiment, the similarity threshold may be discriminatively learned. For example, a collection of negative training sets may be collected defined as N. Each object image 159 in the object repository 156 is defined as $c_i$ and the similarity threshold for the respective object image 153 is defined as $t_i$. In solving for $t_i$. The similarity threshold for each object image 159 can be defined as:

$$t_i = \max_{j \in N} s_i(x_j)$$

where $s_i(x)$ is the similarity score between the object image 159 and a test image 153 and N represents a negative training set.

The detection service 143 then aggregates all of the similarity voting maps after similarity voting maps have been gated using the similarity threshold. In one embodiment, the aggregation is defined as follows:

$$S(x) = \sum_{i: s_i(x) > t_i} (s_i(x) - t_i)$$

where $S(x)$ is the final similarity score for the test image 153, $s_i(x)$ is the similarity score between the test image 153 and the object image 159, and t is the corresponding similarity threshold. The aggregation of the similarity voting maps is implemented after the gating to remove any similarity voting maps of object images 159 that are unlikely to depict the object in the test image 153. Thus, the similarity voting maps that are associated with a similarity score that is less than the similarity threshold are treated as providing no information about the object depicted in the test image 153. Excluding similarity voting maps associated with a similarity score that is less than the similarity threshold in the aggregation of the similarity voting maps will result in a higher confidence in the aggregation. After aggregating the similarity voting maps that are within the similarity threshold, the detection service 143 then selects the maximum nodes from the maps with non-maxima suppression to get the final detection results, as known in the art. Non-maximum suppression is known in the art to be a local maximum search where a local maximum is greater than the value of its surrounding neighbors. For example, the high similarity portion of the aggregated similarity voting map may be the center of the sub-rectangle that defines the bounds of the object in the test image 153.

Next, the landmark service 146 estimates a location of the landmarks of the object depicted in the test image 153 that correspond with the landmarks indicated in the object depicted in the detected object images 159. In one embodiment, the landmark service 146 localizes each object image 159 to determine the location of landmarks in the test image 153 that correspond with the landmarks of the respective object image 159. For example, the landmark service 146 invokes the similarity voting service 139 to localize the object image 159 by determining similarity scores and generating similarity voting maps, as discussed above. In one embodiment, the similarity voting service 139 generates a similarity voting map based on each landmark in each one of the object images 159. Additionally, the similarity voting service 139 may apply a weight to matching features between the respective object image 159 and the test image 153 that are closer to the respective landmark than those that are farther away. In one embodiment, the weight may be computed as a function of the distance between the feature and respective landmark. In some instances, the weight may be given a value of 1 in which case separate voting maps may not need to be generated for the different landmarks. Additionally, the weight may also be based on the size of the image. For instance, the weight may be nominalized according to the size of the image.

Each generated similarity voting map is used to estimate a separate landmark of the test image 153. The landmark service 146 then determines the location of the land mark in the test image 153 that corresponds with the landmark of the object image 153 based on the highest similarity score in the similarity voting map of the respective landmark. For example, the highest similarity score in the weighted similarity voting map of the respective landmark indicates the center of the corresponding landmark in the test image 153. The landmark service 146 then averages the estimated locations from each of the detected object images 159 to generate a final location for the corresponding landmarks in the test image 153.

FIG. 3 depicts a plurality of test images 153 with challenging views. For example, test image 153a depicts a face with a profile view that only shows a portion of the features of a face. Test image 153b depicts a face partially occluded that skews the view of the features of a face. For instance, a hand casts a shadow across the face, blocks a portion of the face and alters the overall focus of the image to create a challenging image for detection. Test image 153c depicts a large face with an angled view that shows only a portion of the features of the face and test image 153d shows multiple faces at varying angles where some of the faces are partially occluded. The test images 153 represent challenging views for image detection using conventional approaches such as the sliding window approach.

FIG. 4 depicts a test image 153, an object image 159 and a similarity voting map 303. In one embodiment, a user on the client device 106 may provide the test image 153 for image detection by manipulating a user interface 149 (FIG. 2) using one or more I/O device 116 (FIG. 2) associated with the client device 106. In this example, the test image 153 includes a plurality of faces for detection and includes two faces. In one embodiment, the detection service 143 (FIG. 2) receives the request to detect the objects (i.e., faces) in the test image 153 and invokes the similarity voting service 139 (FIG. 2) to generate a plurality of similarity voting map 303 for the test image 153 based on each of the object images 159 (FIG. 2) of the object repository 156 (FIG. 2). In this example, the object image 159 represents an exemplar image from the object repository 156 and the similarity voting map 303 represents the similarity between the test image 153 and the object image 159.

The similarity voting service 139 generates the similarity voting map 303 based on a similarity score between a sub-rectangle in the test image 153 and a sub-rectangle in the object image 159. In one embodiment, the similarity score may be defined as follows:

$$S(x, c_i) = \sum_{k=1}^{N} \sum_{\substack{(f_i, g_j) \\ f_i \in x, g_j \in c_i \\ w(f_i) = w(g_j) = k \\ \|T(L(f_i)) - L(g_j)\| < \epsilon}} \frac{idf^2(k)}{tf_x(k) \cdot tf_{c_i}(k)}$$

where x is the test sample (i.e., a sub-rectangle in the test image 153), and $c_i$ is the i-th object image 159 in the object repository 156. $f_i$ are the local features extracted from the test sample x, and $g_j$ are the local features extracted from the ci object image 159. k denotes the k-th visual word in a learned vocabulary. For instance, a visual word corresponds to a cluster of extracted features of an image and the vocabulary corresponds to all of the clusters of the image. idf(k) is the inverse document frequency of k, $tf_x(k)$ and $tf_{ci}(k)$ are the term frequencies (i.e., number of occurrences) of k in x and $c_i$ respectively. $L(f)=(x_f, y_f)$ is the 2D image location of f. The spatial constraint $\|T(L(f_i))-L(g_j)\|<\epsilon$ means that the locations of the two matched features should be sufficiently close under certain transformations. In one embodiment, this similarity score may be calculated on multiple scales.

The similarity voting service 139 generates the similarity voting map 303 based on the similarity scores for matching features between portions of the test image 153 and the sub-rectangle of the object image 159 as described above. In FIG. 3, the matching features of the faces in the test image 153 and the object image 159 are determined for a sub-rectangle and mapped, where the densely occurring concentric shapes indicate a high similarity score and sparsely occurring concentric shapes indicates a low similarity score. In this example, the portion of the test image 153 involving the young boy ranked higher in similarity score than the portion of the test image 153 involving the older man. Therefore, the portion of the similarity voting map involving the young boy depicts a larger amount of densely occurring concentric shapes than the portion of the similarity voting map involving the older man in the test image 153.

Figure 5:
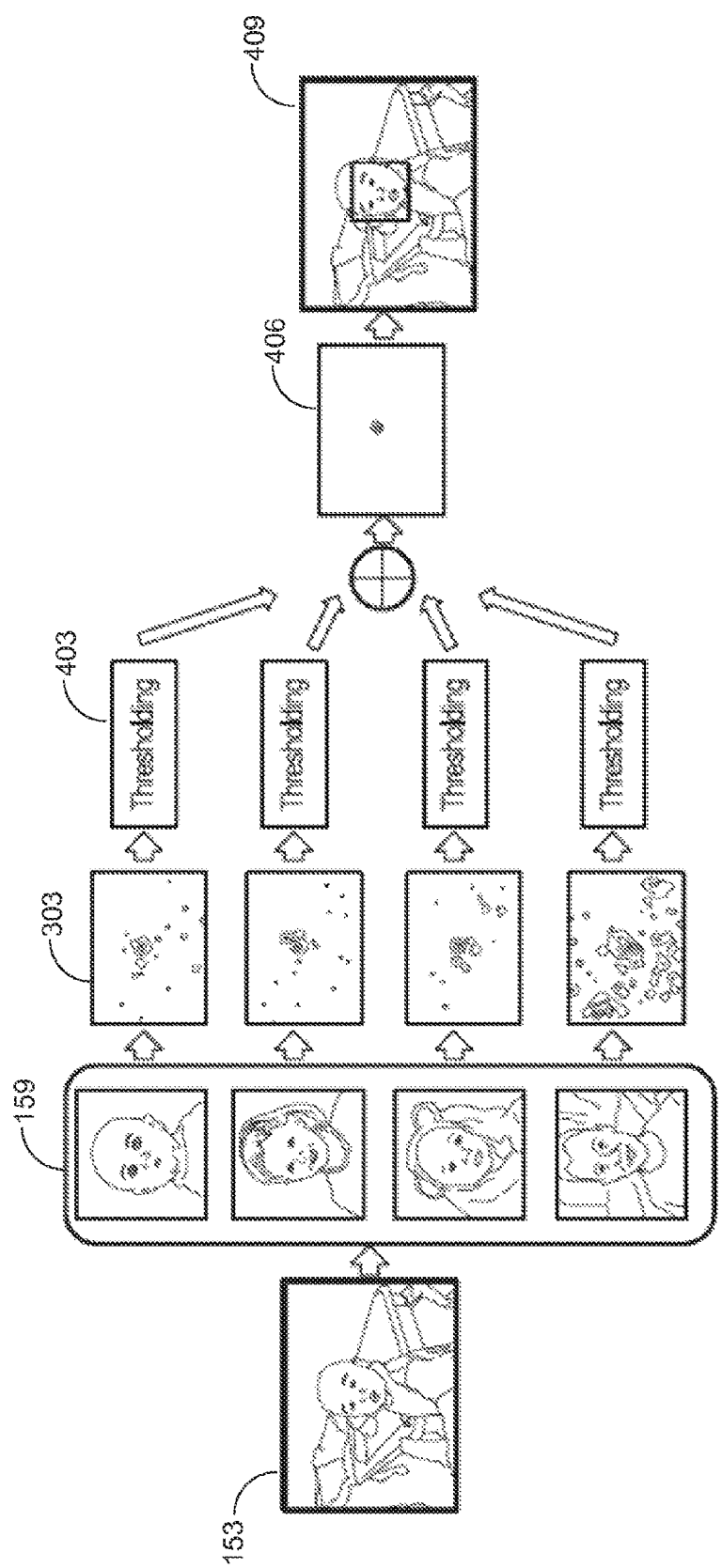
FIG. 5 is an illustration of a pipeline for detecting an object depicted in a test image based on similarity voting maps.

FIG. 5 illustrates a pipeline for image detection using the embodiments described herein. Included in FIG. 5 is an example of a test image 153, a set of object images 159 from the object repository 156 (FIG. 2), a set of similarity voting maps 303 depicting the similarity scores on a voting map between the test image 153 and the respective object image 159, thresholding 403, an aggregate similarity voting map 406, and a detected image 409. As discussed above, the detection service 143 receives the test image 153 to detect the object (i.e., face) depicted in the test image 153. In response, the detection service 143 invokes the similarity voting service 139 to generate the similarity voting maps 303 for each one of the object images 159 of the object repository 156 based on the test image 153. For example, the similarity voting service 139 generates a similarity voting map 303 between the test image 153 and each object image 159 by scoring the similarity of matching features between portions of the test image 153 and a sub-rectangle of the object image 159, as discussed above. Therefore, the similarity voting service 139 generates a similarity voting map 303 for each object image 159 in the object repository 156.

Next, the detection service 143 implements thresholding to determine whether each of the similarity voting maps 303 is within a similarity threshold. In one embodiment, the detection service 143 determines whether a similarity voting map 303 is associated with a similarity score that is within a similarity threshold for the corresponding object image 159. Upon determining which similarity voting maps 303 are equal to or greater than the similarity threshold, the detection service 143 aggregates the similarity voting maps 303 that are equal to or greater than the similarity threshold to generate an aggregate similarity voting map 406. In one embodiment, aggregating the similarity voting maps 406 may be defined as follows:

$$S(x) = \sum_{i:s_i(x)>t_i} (s_i(x) - t_i)$$

where S(x) is the final similarity detection score of x which is the test image 153, $s_i(x)$ is the similarity score between the test image 153 x and the object image 159 $c_i$, and $t_i$ is the corresponding similarity threshold. Upon generating the aggregated voting map 406, the detection service 143 selects the detected image 409 by selecting the maximum modes from the aggregated voting map 406 with non-maxima suppression.

Figure 6:
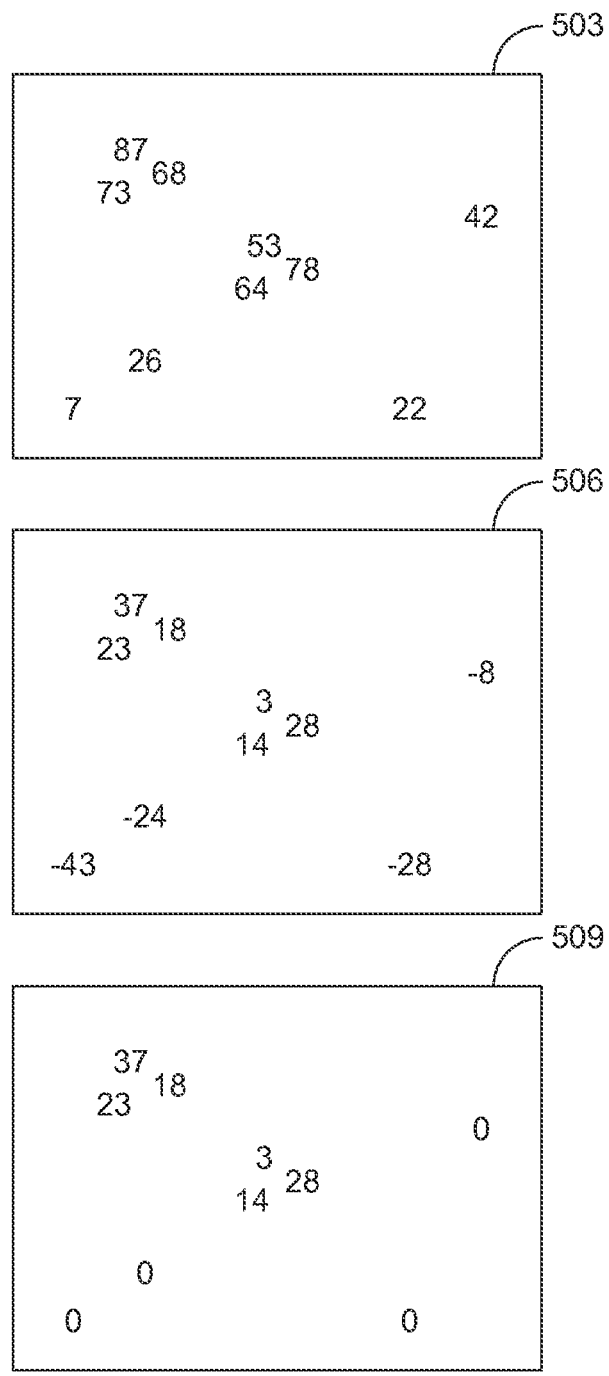
FIG. 6 is an illustration of gating a similarity voting map based on a similarity threshold associated with the object image used to generate the similarity

FIG. 6 is all an illustration of gating implemented on the similarity voting maps using a similarity threshold. The similarity voting map depicts a similarity between one of an object images and a test image. As shown in FIG. 6, three similarity voting maps 503, 506 and 509 are depicted. A similarity voting map is comprised of one or more similarity scores that are generated as discussed above. For example, the similarity voting service 139 (FIG. 2) generates a similarity scores at different locations. In this embodiment, the similarity scores are represented as numerical values in map 503.

To implement gating, the detection service 143 identifies the similarity threshold for the object image used to generate the similarity voting map 503 and subtracts the similarity scores represented in the similarity voting map 503 with the similarity threshold. For example, the similarity threshold for an object image may be 50. The detection service 143 subtracts each one of the similarity scores by 50 as shown in map 506. In one embodiment, the similarity threshold represents the maximum value of a false positive result using that object image in the past. Any similarity scores below the similarity threshold are likely to be non-object portions of the test image 153 and thus can be disregarded for purposes of object detection.

Subtracting the similarity threshold from the similarity scores may produce negative similarity scores. For example, if the similarity score is not high enough, then the resulting value after the subtraction will be a negative value. The negative similarity scores can be considered to not provide useful information about the possible location of the object in the test image and thus may be disregarded. As such, in the gating process, such negative scores can be zeroed as shown in map 509 so that these values do not adversely affect the aggregation step.

FIG. 7 is an illustration of selecting maximum modes and implementing non-maxima suppression. Shown in FIG. 7 are two similarity voting maps 603 and 606. In one embodiment, map 603 represents an aggregated similarity voting map where the detection service 143 (FIG. 2) has implemented gating on each similarity voting map generated by the similarity voting service 139 (FIG. 2) and aggregated all the gated similarity voting maps. Map 603 includes two neighborhoods of similarity scores that have been aggregated from all of the similarity voting maps generated by the similarity voting service 139. In one embodiment, each neighborhood may correspond to one object depicted in the test image 153. For example, the test image 153 may depict two faces as shown in FIG. 3.

The detection service 143 selects maximum modes in each neighborhood and implements non-maxima suppression of the other nodes in the neighborhood to determine the center of the object depicted in the test image. For example, the first neighborhood of similarity scores may correspond to features of a first object depicted in the test image 153 and the second neighborhood of similarity scores may correspond to features of a second object depicted in the test image 153. The detection service 143 identifies the maximum similarity score in each neighborhood and suppresses the non-local maxima in the neighborhood. Thus, as shown in map 606, the remaining scores are 237 of the first neighborhood and 212 of the second neighborhood. The remaining maximum modes of the neighborhoods each represent the center of an object depicted in the test image 153.

Figure 8:
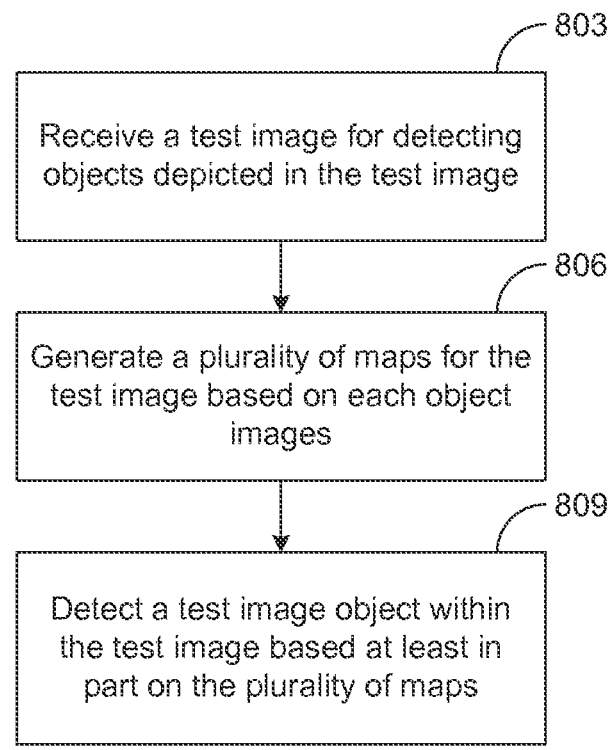
FIG. 8 is a flow chart illustrating an exemplary method of detecting an object depicted in a test image based on similarity voting maps and similarity thresholds.

FIG. 8 is a flowchart that provides one example of the operation of a portion of the detection service 143 (FIG. 2) according to certain embodiments. It is understood that the flowchart of FIG. 8 provides merely an example of the many different types of functional arrangements that may be employed to implement the operation of the portion of the detection service 143 as described herein. As an alternative, the flowchart of FIG. 8 may be viewed as depicting an example of steps of a method implemented in the computing device 103 (FIG. 2) according to one or more embodiments.

Beginning at step 803, the detection service 143 receives a test image 153 for detecting one or more objects depicted in the test image. For example, a user on a client device 106 (FIG. 2) may provide the test image 153 for detection via a user interface 149 (FIG. 2). In step 806, the detection service 143 invokes the similarity voting service 139 to generate a plurality of maps depicting the similarity between the test image 153 and each one of a plurality of object images 159. In one embodiment, the similarity voting service 139 generates the maps based at least in part on similarity scores determined from matching features between the test image 153 and the object image 159.

Then, in step 809, the detection service 143 detects a test image object within the test image 153 based at least in part on the plurality of maps. In one embodiment, the detection service 143 gates each one of the maps based on the similarity threshold associated with the corresponding object image 159 used to generate the map. To this end, the detection service 143 subtracts the similarity threshold from the similarity scores represented in each map and zeros any resulting negative values to generate a gated map. The detection service 143 then aggregates the gated maps to generate an aggregate map. For example, the detection service 143 adds all of the similarity scores from the gated maps to generate the aggregate map. Having aggregated the gated maps, the detection service 143 then selects the maximum modes in a neighborhood of similarity scores and suppresses the non-maxima nodes of the neighborhood. The resulting aggregated map indicates the location of the objects depicted in the test image 153. For instance, the maximum modes represent the center of one of the objects depicted in the test image 153.

Figure 9:
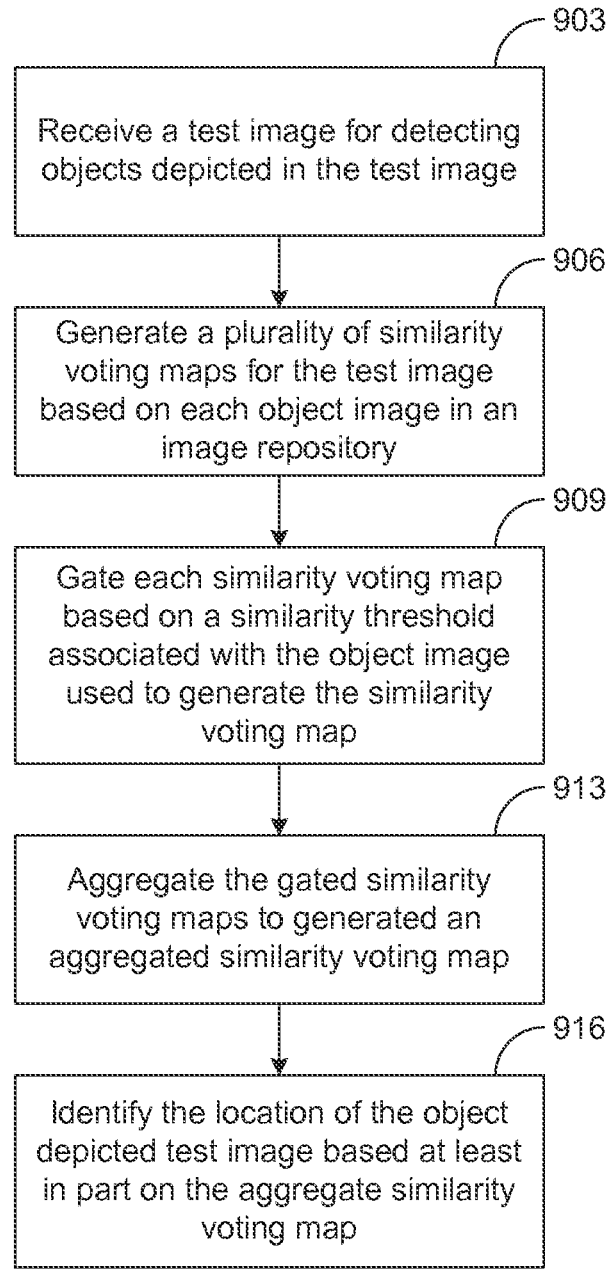
FIG. 9 is a flow chart illustrating another exemplary method of a detection service for detecting an object depicted in a test image.

FIG. 9 is a flowchart that provides one example of the operation of a portion of the detection service 143 (FIG. 2) according to certain embodiments. It is understood that the flowchart of FIG. 9 provides merely an example of the many different types of functional arrangements that may be employed to implement the operation of the portion of the detection service 143 as described herein. As an alternative, the flowchart of FIG. 9 may be viewed as depicting an example of steps of a method implemented in the computing device 103 (FIG. 2) according to one or more embodiments.

Beginning at step 903, the detection service 143 receives a test image 153 (FIG. 2) for detecting objects depicted in the test image 153. In one embodiment, a user on a client device 106 (FIG. 2) may manipulate a user interface 149 via one or more I/O devices 116 (FIG. 2) to transmit a request to the detection service 143 to detect the object in the test image 153. For example, the test image may be a photograph and the object may be a face of an individual.

In step 906, the detection service 143 invokes the similarity voting service 139 to generate a plurality of similarity voting maps for the test image 153 based on each one of the object images 159 (FIG. 2) in an object repository 156 (FIG. 2). In one embodiment, the similarity voting service 139 generates the similarity voting map by identifying matching features between a sub-rectangle of the object image 159 and portions of the test image 153. The similarity voting service 139 then determines the similarity between the matching features in the two images and generates the similarity voting map.

Next, in step 909, the detection service 143 implements gating on each similarity voting map based on a similarity threshold associated with the respective object image 159 used to generate each similarity voting map. In one embodiment, the detection service 143 identifies the similarity threshold for each object image 159 and subtracts the similarity threshold from the similarity scores represented in the similarity voting map generated from that object image 159.

Any negative values resulting from the subtraction are zeroed and thus disregarded. These values provide no information as to the location of the object depicted in the test image 153. The remaining values (all positive values) represent a similarity that exceeds the minimum necessary to be similar to object in the object image 159, i.e., a face.

Next, in step 913, the detection service 143 aggregates the similarity voting maps after they have been modified via gating to generate an aggregated similarity voting map. In one embodiment, the aggregated similarity voting includes aggregated similarity scores of all of the gated similarity voting maps. Upon generating the aggregate similarity voting map, in step 916 the detection service 143 identifies the location of the object depicted in the test image 153 based at least in part on the aggregate similarity voting map. For example, the highest similarity as shown in the similarity voting map may represent the center of the object depicted in the test image 153. In one embodiment, local maximum nodes of the aggregate similarity voting map may be identified and their corresponding non-maxima may be suppressed to reduce the likelihood of falsely identifying the location.

Figure 10:
FIG. 10 is an illustration of determining a location of landmarks in the test image based on landmark indicators in each of the object images.

FIG. 10 illustrates the landmark service 145 estimating a location for landmarks in the test image 153 based on the locations of corresponding landmarks in the set of top ranked detected object images 159 (FIG. 1). In one embodiment, the landmark service 145 identifies a location of one or more landmarks in each one of the top ranked detected object images 159 and determines a location for a corresponding landmark in the test image 153 based at least in part on localization of the object images 159. FIG. 10 shows object images 159 that include four different landmarks as indicated by landmark indicators 1006, 1009, 1013 and 1016 in one of the object images 159 of the set of object images 1003. In this example, the object depicted in the object image 153 is a face and the landmarks include a left eye, a right eye, a nose and a mouth of the face. Additionally, these object images 159 may have been previously detected to be depict a similar object as the test image 153 by the detection service 143 based on a similarity score, as discussed above. In another embodiment, the detection service 143 may detect the object images 159 based on a generalized Hough voting approach and/or any other detection approach. Each test image 153a, 153b and 153c shown in FIG. 10 has a corresponding set of detected object images 1003a, 1003b and 1003c. Further, each object image 159 in the set of object images 1003a, 1003b and 1003c may be depicted in a ranked order. For example, the object images 159 may be ranked based on the similarity score where the object image 159 closest to the test image 153 exhibits the highest similarity score.

Additionally, each object image 159 in the set of object images 1003a, 1003b and 1003c includes a sub-rectangle. The sub-rectangle represents a known location of the object (i.e., face of the individual) depicted in the object image 159. For instance, the sub-rectangle indicating the location of the object depicted in the object image 159 may be indicated by a ground-truthing process where the location is manually indicated. Each landmark in the sub-rectangle of the object image 159 may also be manually indicated by the ground-truthing process. For example, the left eye is indicated with a landmark indicator 1006, the right eye is indicated with a landmark indicator 1009, the nose is indicated with a landmark indicator 1013 and the mouth is indicated with a landmark indicator 1016 in one of the object images 159. As shown in FIG. 10, the known location of the object in each object image 159 is indicated with a rectangle.

The landmark service 145 estimates a location in the test image 153 for each of the landmarks that correspond with the landmarks of the object images 159. In one embodiment, the landmark service 145 localizes each object image 159 to determine a location for each landmark in the test image 153 that corresponds with a landmark identified in the object image 159. For example, the landmark service 145 may invoke the similarity voting service 139 (FIG. 2) to identify matching features between the face in the object image 159 and the test image 153 and to calculate a relative location of the matching feature to the known location of the landmark in the face of the object image 159. The similarity voting service 139 may then vote on the estimated location of that landmark in the test image 153. For instance, the similarity voting service 139 generates a similarity voting map that includes similarity scores for the matching features.

In one embodiment, the similarity voting service 139 generates a similarity voting map for each landmark indicated in the object image 159. In particular, the similarity voting service 139 applies a weight on matching features based on the relative distance between the matching feature and the respective landmark in generating the similarity voting map for the landmark. For instance, features that are closer to the landmark are given a higher weight than any features farther away from the landmark. To this end, the portions of the object image 159 may be emphasized unequally such that a higher emphasis can be placed on certain portions of the face that are closer to the respective landmark. In this example, each object image 159 has been previously identified has having four landmarks. For instance, to localize the object image 159 for identifying a location of a landmark in the test image 153 that corresponds with the left eye, the similarity voting service 139 may apply more weight to the matching features that are closer to the left eye than any matching features that are farther away from the left eye. Accordingly, the similarity voting service 139 generates four different weighted similarity voting maps, one for each landmark of the object image 159. The highest similarity in each similarity voting map indicates the estimated location of the center of that landmark in the test image 153. Additionally, the similarity voting service 139 generates weighted similarity voting maps for each landmark in each of the object images 159 in the set of top-ranked images 1003.

The landmark service 145 receives the estimated locations for each landmark based on each of the object images 159 in the set of top-ranked images 1003 and averages the estimated locations. For example, FIG. 10 depicts four object images 159 in each set of top-ranked images 1003. The landmark service 145 receives four estimated locations for each landmark and determines the average location for the landmark in the test image 153 based on the four estimated locations. In one embodiment, the average location as determined by the landmark service 145 represents the location of the landmark in the test image 153 that corresponds with the respective landmark in the object images 153 in the set of top-ranked object images 1003.

Figure 11:
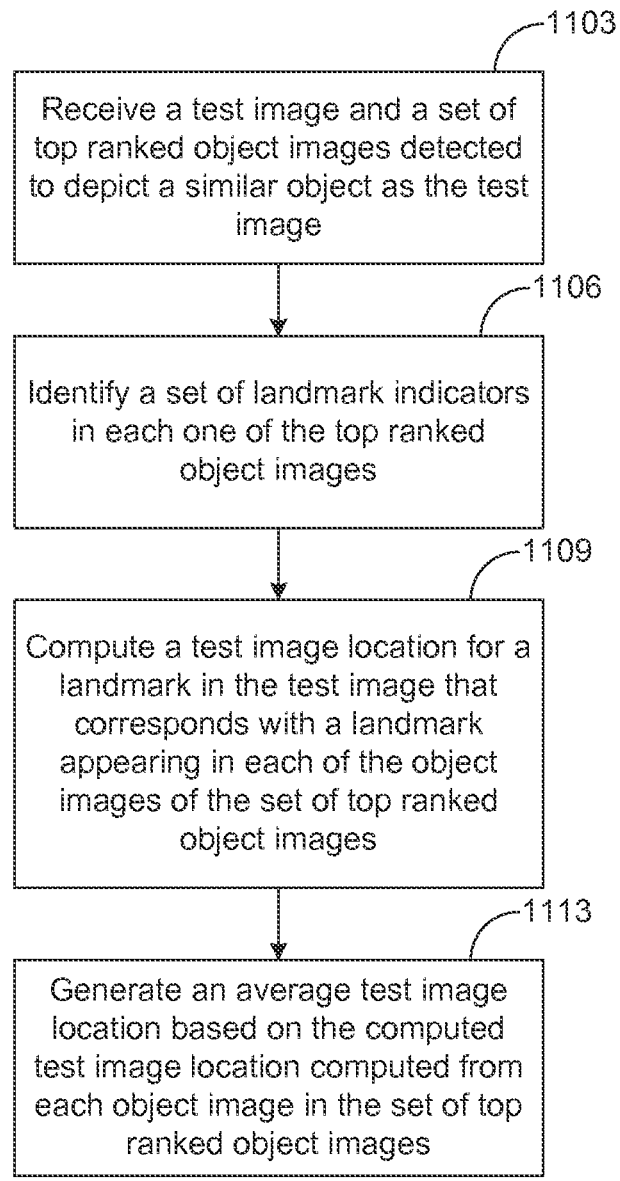
FIG. 11 is a flow chart illustrating an exemplary method of a landmark service for determining a location of landmarks in the test image.

FIG. 11 is a flowchart that provides one example of the operation of a portion of the landmark service 145 (FIG. 2) according to certain embodiments. It is understood that the flowchart of FIG. 11 provides merely an example of the many different types of functional arrangements that may be employed to implement the operation of the portion of the landmark service 145 as described herein. As an alternative, the flowchart of FIG. 11 may be viewed as depicting an example of steps of a method implemented in the computing device 103 (FIG. 2) according to one or more embodiments.

At step 1103, the landmark service 145 receives a test image 153 (FIG. 1) and a set of top ranked object images 159 (FIG. 1) detected to depict a similar object as the test image 153. In one embodiment, the detection service 143 (FIG. 1) identifies the object images 159 that depict a similar object as the test image 153 as discussed above. In another embodiment, another similarity approach may be implemented to identify the object images 159 in the set of top ranked object images 159. For example, the generalized Hough voting approaching may be used, as known in the art.

Next in step 1106, the landmark service 145 identifies a set of landmark indicators in each one of the top ranked object images 159. In one embodiment, the landmark indicators indicate a location of landmarks in the object depicted in the object image 159. For example, the object depicted in the object image 159 may be a face of an individual and the landmarks may include a left eye, a right eye, a nose and a mouth. Additionally, the landmark indicators may have been defined manually via ground-truthing.

In step 1109, the landmark service 145 computes a test image location for a landmark in the test image 153 that corresponds with a landmark appearing in the object images 159 of the set of top ranked images. In one embodiment, the landmark service 145 computes an estimated location of a landmark in the test image 153 by invoking the similarity voting service 139 to generate a weighted similarity voting map based on the corresponding landmark in each one of the object images 159 in the set of top ranked object images. The location of the highest similarity score in the weighted similarity voting map may represent the location of the landmark in the test image 153 that corresponds with the respective landmark in the object image 159. Thus, for k number of object images 159 in the set of top ranked object images, the landmark service 145 computes k estimated locations for the same landmark based on k separate weighted similarity voting maps. Then, in step 1113, the landmark service 145 generates an average test image location based on the estimated locations computed from each object image in set of top ranked object images.

Figure 12:
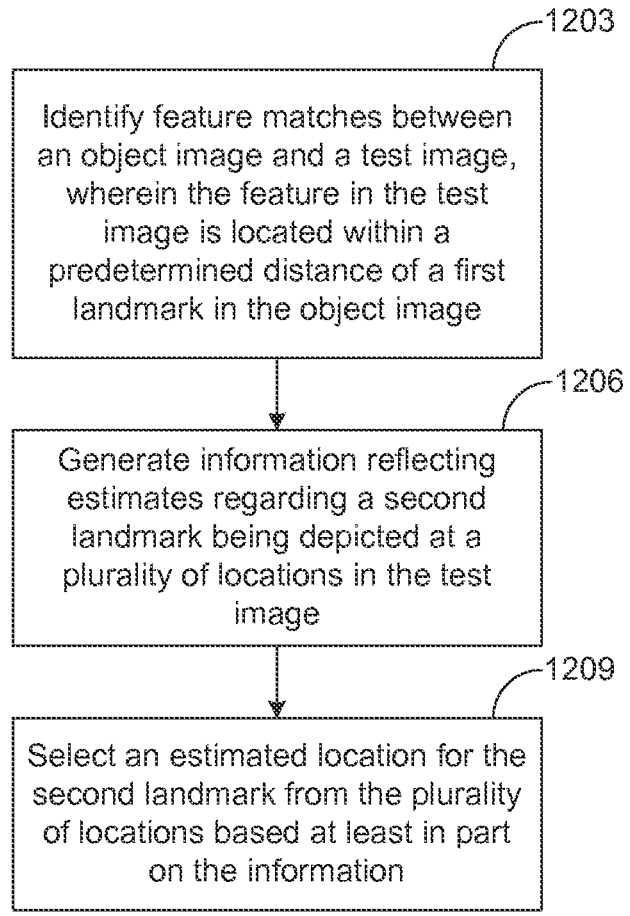
FIG. 12 is a flow chart illustrating an exemplary method of a landmark service for estimating a location of landmarks in the test image.

FIG. 12 is a flowchart that provides one example of the operation of a portion of the landmark service 145 (FIG. 2) according to certain embodiments. It is understood that the flowchart of FIG. 12 provides merely an example of the many different types of functional arrangements that may be employed to implement the operation of the portion of the landmark service 145 as described herein. As an alternative, the flowchart of FIG. 12 may be viewed as depicting an example of steps of a method implemented in the computing device 103 (FIG. 2) according to one or more embodiments.

Beginning with step 1203, the landmark service 143 identifies feature matches between an object image 159 and a test image 153, wherein the feature in the test image 153 is located within a predetermined distance of a first landmark in the object image. In one embodiment, the landmark service 143 may invoke the similarity voting service 139 to identify the matching features between the object image 159 and the test image 153. For example, the similarity voting service 139 may identify the matching features based at least in part on spatial information of the images. Additionally, the similarity voting service 139 may emphasize the portion of the object image 159 around the first landmark by applying more weight to the features located within a predetermined distance of the first landmark.

In step 1206, the similarity voting service 139 may generate information reflecting estimates regarding a second landmark being depicted at a plurality of locations in the test image 153. For example, the information may be similarity voting maps that are weighted to emphasize portions around the first landmark. The similarity voting map may depict a "heat map" that estimates a potential location of the second landmark in the test image 153 based on similarity scores between features of the test image 153 and the object image 159. Then, in step 1209, the landmark service 145 selects an estimated location for the second landmark from the plurality of locations in based at least in part on the information. In one embodiment, the highest similarity score in the similarity voting map may represent the location of the second landmark in the test image 153.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
   receiving, at a computing device comprising a processor, a test image and a plurality of object images detected to depict an object similar to the test image;
   receiving a plurality of landmark indicators, each landmark indicator indicating a location of a landmark in the object depicted in a respective one of the object image;
   for each object image, determining a location of a test image landmark that corresponds with the respective landmark indicator in the object image; and
   computing a final test image landmark location based on the determined locations of the test image landmarks.

2. The computer-implemented method of claim 1, wherein the landmark indicators of the object images are manually identified to indicate a location of the landmark.

3. The computer-implemented method of claim 1, wherein generating the similarity voting map comprises identifying matching features between the test image and one of the landmarks of the object image indicated by the landmark indicator.

4. The computer-implemented method of claim 3, wherein the similarity voting map is generated by applying a weight to a plurality of matching features that are within a predetermined distance of the landmark indicated by the landmark indicator relative to matching features that are farther than the predetermined distance to the landmark indicated by the landmark indicator.

5. The computer-implemented method of claim 3, wherein the matching features are identified based on spatial information between the object image and the test image.

6. The computer-implemented method of claim 1, wherein a highest similarity score in the similarity voting map represents the test image landmark that corresponds to landmark indicator in the object image.

7. The computer-implemented method of claim 1, wherein the object depicted in the test image is a face.

8. The computer-implemented method of claim 1, wherein the landmarks include at least one of a nose, a mouth, a left eye and a right eye.

9. A system comprising:
   a processor for executing instructions stored in computer-readable medium on one or more devices,
   the instructions comprising one or more modules configured to perform the steps comprising:
   receiving a test image having a face and a plurality of object images, each one of the object images depicting a face detected to be similar to the face depicted in the test image;
   identifying a plurality of landmark indicators associated with each one of the object images, each landmark indicator indicating a location of a landmark in the object depicted in the object image; and
   computing a test image landmark location of each test image landmark that corresponds to one of the landmark indicators based at least in part on generating a plurality of similarity voting maps between the test image and each one of the object images.

10. The system of claim 9, wherein the plurality of similarity voting maps are generated for each landmark identifier in each object image.

11. The system of claim 9, wherein each similarity voting map is based on matching features between the test image and one of the landmarks of the object image indicated by the landmark indicator.

12. The system of claim 9, wherein each similarity map is generated by applying a weight to a first set of matching features that are located within a threshold distance of the landmark identifier relative to a second set of matching features that are located farther than the predetermined distance to the landmark indicator.

13. The system of claim 9, wherein the test image landmark location is computed based at least in part on the corresponding landmark indicator in each one of the object images.

14. The system of claim 9, wherein the computed test image landmark location is an average of a plurality of object-image-specific test image landmark locations.

15. The system of claim 9, wherein a highest similarity score in the similarity voting map represents the test image landmark that corresponds to landmark indicator in the object image.

16. The system of claim 9, wherein the landmark indicators are manually indicated.

17. The system of claim 9, wherein the received object images are a set of top ranked object images determined to depict the similar face as the test image based on a similarity score between the test image and the respective object image.

18. A method comprising:
   identifying feature matches between each of a plurality of object image and a test image, each of the feature matches between a feature of a respective object image and a matching feature of the test image, wherein there is a spatial relationship between each respective object image feature and a first landmark of the object image, the first landmark at a known location in the object image;
   estimating a plurality of locations for a second landmark for the test image, the estimated locations based at least in part on the feature matches and the spatial relationships; and
   estimating a final location for the second landmark from the plurality of locations for the second landmark for the test image,
   wherein identifying the feature matches, estimating the plurality of locations, and estimating the final location are performed by a processor of a computing device executing instructions.

19. The method of claim 18, wherein estimating the plurality of locations for the second landmark is further based on feature matches between the test images and additional object images and corresponding additional spatial relationships for the additional object images.

20. The method of claim 18, wherein estimating the final location for the second landmark comprises averaging potential landmark locations identified using multiple object images.

* * * * *